Figure 1:
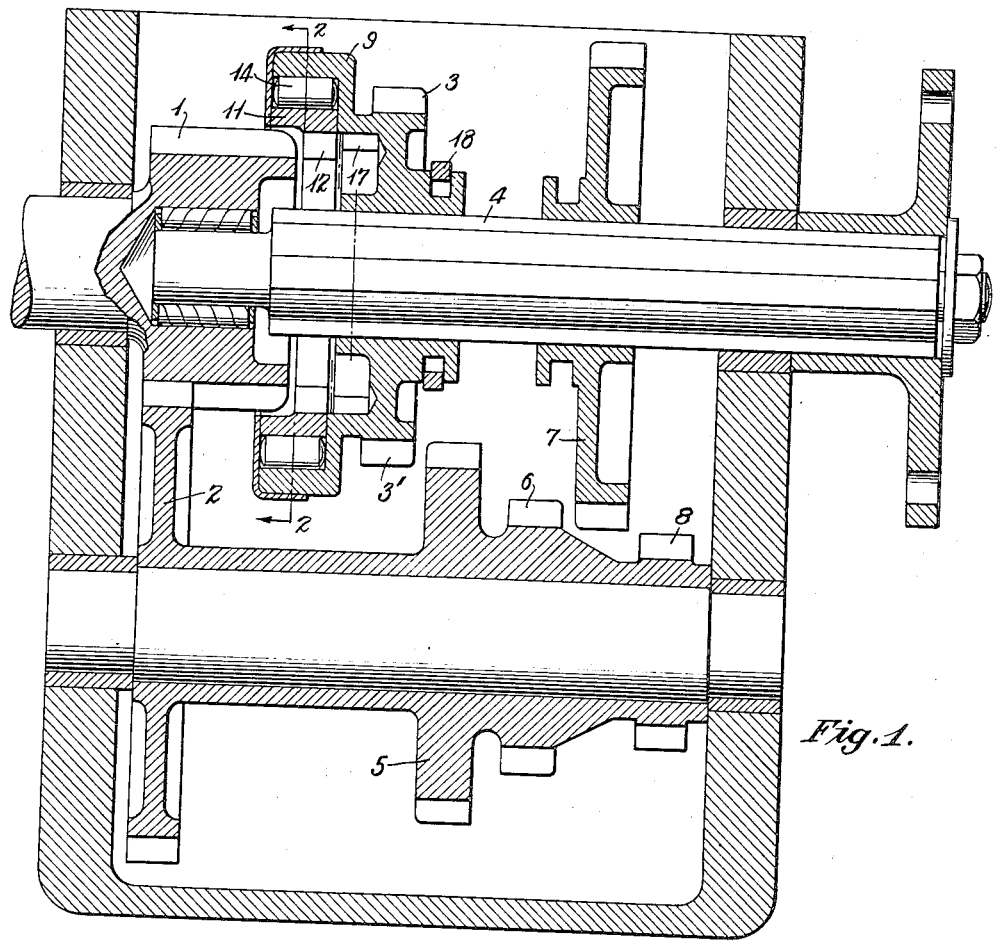

Feb. 23, 1937.  C. F. RAUEN  2,072,058
CLUTCH STRUCTURE
Original Filed May 29, 1923

Inventor
Carl F. Rauen

By Charles W. Hill
Attorney

Patented Feb. 23, 1937

2,072,058

UNITED STATES PATENT OFFICE 2,072,058

CLUTCH STRUCTURE

Carl F. Rauen, Grosse Pointe, Mich.

Original application May 29, 1923, Serial No. 642,300, now Patent No. 1,799,987, dated April 7, 1931. Divided and this application February 21, 1931, Serial No. 517,581. Renewed September 13, 1935

68 Claims. (Cl. 192—48)

This application is a division of my copending application for Power transmission, Serial No. 642,300, filed May 29, 1923, which issued April 7, 1931, as Patent No. 1,799,987.

This invention relates to clutch structure for power transmission systems and the object of the same is to provide a clutch structure whereby the driving part will automatically be disengaged from the driven part when the speed of the latter exceeds the speed of the driving part, with the provision for further operation so that the driven part may drive the driving part if so desired.

Another object is to provide a clutch structure that will facilitate the coupling of said driving and driven parts, for both an overrunning and a positive drive.

Further objects and advantages will be more fully set forth in the attached specification and claims.

Figure 2:
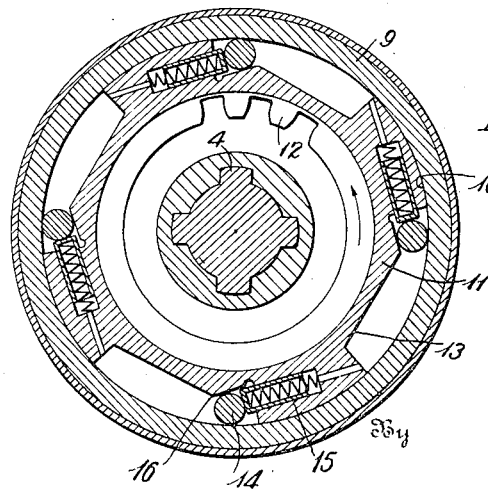

In the drawing:

Figure 1 is a vertical section through a transmission gear box and Figure 2 is a vertical section on the line 2—2 of Figure 1.

The drawing shows my invention as applied to a transmission gear box of a motor vehicle as one adaptation of the same. A stem gear 1 is connected to the motor or prime mover in the customary manner through a suitable clutch device not shown, and meshes with the countershaft gear 2. The second speed sliding gear 3 is suitably splined to the transmission shaft 4, which is connected in the customary manner to the drive wheels of the vehicle. This gear 3 is provided with external teeth 3' which engage with the teeth on a second speed countershaft gear 5 when the gear 3 is moved from its position as shown in Figure 1, to the right. A low speed gear 6 is provided on the countershaft and the sliding low speed gear 7 is suitably splined on the shaft 4. The gear 7 is adapted to mesh with the gear 6 or adapted to mesh with the reverse idler gear, not shown, which engages with the reverse countershaft gear 8.

Instead of engaging the gear 3 with the stem gear 1 in the customary manner for the direct drive of the shaft 4 from the motor, means are provided as will now be more fully described so that the gear 3 may be connected through an overrunning clutch to the stem gear 1.

The sliding gear 3 is provided integrally therewith with the cylinder 9 which is the shell of an overrunning clutch 10. A cam member 11 is provided with internal teeth 12 which are adapted to engage with teeth on the stem gear 1 when the cam member is moved from its position as shown in Figure 1, to the left. This cam member is provided with cut-away portions 13, within each of which is a roller 14 adapted to be pressed by spring 15 so as to be urged by this spring away from its position in the end of the cut-away portion as more fully shown in Figure 2. The cut-away portions are suitably tapered, the distance between the point 16 of each cut-away portion and the fixed outer shell member 9 being smaller than the diameter of the roller. It will be seen, therefore, that the springs and the rollers will prevent a clockwise rotation of the shell member 9 in relation to the cam member 11 so that when the cam member 11 is driven counter-clockwise as viewed in Figure 2, it will drive the shell portion 9. When the teeth 12 of the cam 11 are engaged with the teeth of the stem gear 1 by a movement of the gear 3 and the overrunning clutch members to the left as viewed in Figure 1, the motor will be connected through the overrunning clutch so as to drive the shell portion 9 and the gear 3. When the speed of the car increases, as for instance when it is coasting down hill with the clutch engaged and the engine idling or running slower than the shaft 4, free coasting will be permitted without disengaging the clutch and without moving the gear 3 by means of this overrunning clutch arrangement.

Internal teeth 17 are provided on the gear 3 and are adapted to engage the teeth of the stem gear 1 when the gear 3 is moved further to the left so that the stem gear 1 may be directly and positively connected to the shaft 4. The engagement of the teeth 17, on the gear 3, with the teeth of the stem gear 1, for a positive drive is facilitated by the operation of the overrunning clutch, as, for instance, when the drive is through the overrunning clutch, the stem gear 1, cam 11, and gear 3 are all turning at the same speed, therefore the teeth 17 can be readily engaged with the teeth on the stem gear 1. Should said teeth abut "head on", the momentary release of the torque will permit a change in the relative position of the teeth so that they can be readily engaged. The gear 3 is moved by a suitable fork arrangement 18 operating in a groove in the gear 3 in the customary manner. The pitch diameter of the teeth of the stem gear 1 and the internal teeth 12 and 17 is less than the pitch diameter of the rollers 14 of the friction or one-way clutch mechanism. It will therefore be seen that means have been provided for coupling the driving shaft to the driven shaft through an overrunning clutch, the device being also operable to positively connect the shafts together when so desired, so that the engine may be used as a brake in descending steep hills, or, if desired, free coasting may be permitted without entirely disengaging the engine from the drive wheels. The advantages of such an arrangement are obvious as the power is available at any instant without following the customary procedure of again engaging the gears or the clutch when freely coasting.

I claim:

1. In a drive system of a motor vehicle, clutch structure comprising a driving shaft, a driven shaft, a driving element on one of said shafts, a second driving element on the other shaft adapted to be clutched with said first driving element, a member having clutch teeth adapted to engage the driving element on said one shaft, and an over-running clutch interconnecting said member and said second driving element, said member and said elements being coaxially arranged, and means for shifting said second driving element and member for selectively engaging said one shaft either by said member or said second driving element whereby either a one-way drive or a two-way drive respectively is obtained.

2. In a drive system of a motor vehicle, clutch structure comprising a driving shaft, a driven shaft in alignment therewith, a clutch element on one of said shafts, a second clutch element on the other shaft having internal clutch teeth adapted to clutch said clutch element, an internally toothed clutch member adapted to clutch said clutch element, said member and said elements being coaxially arranged, an overrunning clutch interconnecting said member and said second clutch element, and means for moving said second clutch element and said clutch member so that said clutch member alone is engaged with said clutch element or so that said second clutch element is engaged with said clutch element.

3. In a drive system of a motor vehicle, clutch structure comprising a drive shaft, and a driven shaft in alignment with said drive shaft, a clutch element on said drive shaft, a second clutch element on said driven shaft having internal clutch teeth adapted to clutch said clutch element, an internally toothed member, said member and said clutch elements being coaxially arranged, an overrunning clutch interconnecting said member and said second clutch element, and means for moving said second clutch element and said member together so that said member alone is engaged with said clutch element or so that both said member and said second clutch element are engaged with said clutch element.

4. In a drive system of a motor vehicle, clutch structure including drive and driven members, means including a longitudinally shiftable overrunning clutch for establishing a one-way drive between said members, means for establishing a direct two-way drive between said members, said means and said members being coaxially arranged, and a shifting device for controlling both of said means.

5. In a drive system of a motor vehicle, clutch structure including a pair of aligned shafts, one of said shafts carrying peripheral teeth, means affording through said teeth a one-way drive connection between said shafts, and means having internal teeth engageable with the said peripheral teeth to establish a two-way drive between said shafts in the same ratio as said one-way drive, said means being arranged coaxially with said shafts.

6. In a drive system of a motor vehicle, clutch structure including a drive shaft, a driven shaft, one of said shafts carrying peripheral clutch teeth, means arranged coaxially with one of said shafts and shiftable axially to afford a one-way drive connection between said shafts, and internal clutch teeth associated with said means and engageable with the said peripheral clutch teeth to establish a two-way drive between said shafts in the same ratio as said one-way drive.

7. In a drive system of a motor vehicle, clutch structure including a drive shaft, a driven shaft, one of said shafts being provided with peripheral clutch teeth, means arranged coaxially with one of said shafts and operatively engaging said teeth for affording a one-way drive connection between said shafts, said means having internal clutch teeth connectable with the said peripheral clutch teeth to establish a two-way, one to one, drive between said shafts.

8. In a drive system of a motor vehicle, clutch structure including a drive shaft, a driven shaft, one of said shafts being provided with peripheral clutch teeth thereon, means operatively connectable with said teeth for affording a one-way drive connection between said shafts, and internal teeth slidably but non-rotatably movable with respect to the other of said shafts and movable into engagement with the said peripheral clutch teeth to establish a two-way drive between said shafts in the same ratio as said one-way drive, said means and said teeth being coaxially arranged.

9. In a drive system of a motor vehicle, clutch construction including a drive shaft, a driven shaft, an overrunning clutch structure to establish a one-way drive between said shafts, said clutch structure including two parts secured against axial movement relative to each other, each part having a set of teeth, each of said sets of teeth comprising a plurality of integrally formed projections extending radially from said parts, and means having radially extending teeth complemental to said projections for simultaneous engagement with both of said sets of teeth to establish a two-way drive between said shafts, said parts and said means being coaxially arranged and a single shift means for controlling said one-way and two-way drives.

10. In a drive system of a motor vehicle, clutch structure including drive and driven parts, an overrunning clutch comprising a plurality of members, one of said members being mounted for rotation with one of said parts, said members and said parts being coaxially arranged, and a device for progressively connecting said clutch members to the other part, whereby to establish respectively a one-way drive and a two-way drive between said parts.

11. In a drive system of a motor vehicle, clutch structure including drive and driven parts, overrunning clutch members for connecting said parts together for a one-way drive, clutch means on said members, clutch means on one of said parts adapted to be clutched to both of said members to prevent relative motion between said members, said last-mentioned means and said members being coaxially arranged, and shiftable means for controlling the clutching of said members to establish a one-way drive between said parts and further movable in the same direction to establish a two-way drive between said parts.

12. In a drive system of a motor vehicle, clutch structure including aligned shafts, one of said shafts carrying peripheral clutch means, means affording through said means a one-way drive connection between said shafts, and means having internal clutch means connectable with the peripheral clutch means carried by said shaft to establish a two-way drive between said shafts in the same ratio as said one-way drive, all of said means being coaxially arranged.

13. In a drive system of a motor vehicle, clutch structure including a pair of shafts, one of said shafts carrying peripheral clutch teeth, means affording through the aforesaid teeth a one-way drive connection between said shafts, means slidable with respect to the other of said shafts and having internal clutch teeth engageable with the said peripheral clutch teeth carried by said one shaft to establish a two-way drive between said shafts in the same ratio as said one-way drive, said means and said teeth being coaxially arranged.

14. In the drive system of a motor vehicle, clutch structure including drive and driven members, one of which is provided with teeth, a one-way clutch comprising a part splined to the other member and a second part having teeth for engaging the teeth on the one member to establish a one-way drive connection between the members, the first part having teeth connectable with teeth on said one member to establish a two-way drive between the members in the same ratio as said one-way drive, said parts and one of said members being coaxially arranged.

15. In the drive system of a motor vehicle, clutch structure including a one-way clutch comprising overrunning parts having teeth, and means comprising teeth for interconnecting the teeth of said parts to lock the parts against overrunning, all of said teeth being of substantially the same pitch diameter, said means and said parts being coaxially arranged.

16. In the drive system of a motor vehicle, clutch structure including a one-way clutch comprising drive and driven overrunning members having teeth, and a third member provided with teeth for engaging the teeth of said members to lock the same together to prevent overrunning thereof, the teeth of all of said members being arranged in substantially coaxial relation, the teeth on each of said members comprising a plurality of integrally formed projections extending radially from said members.

17. In the drive system of a motor vehicle, clutch structure including an overrunning clutch device comprising one-way overrunning drive and driven members, each of said members having clutch teeth comprising a plurality of integrally formed projections extending radially therefrom and arranged at all times in end to end relation, and coupling means for cooperating with the teeth of said members to prevent overrunning between said members, said members and said means being coaxially arranged.

18. In the drive system of a motor vehicle, clutch structure comprising drive and driven members, means including a shiftable overrunning clutch affording a one-way drive between said members, means associated with said clutch for preventing overrunning between said members, said means being arranged coaxially with one of said members, and means for controlling both of said means.

19. In the drive system of a motor vehicle, clutch structure including a member having a set of teeth extending radially therefrom, overrunning parts, each provided with a set of teeth extending radially therefrom, engagement of the teeth of one part with those of the member affording an overrunning one-way drive between said member and the other part, and engagement of the teeth of the other part with those of said member preventing overrunning between said member and the other part, said member and said parts being coaxially arranged.

20. In a drive system of a motor vehicle, clutch structure including coaxial drive and driven parts, one of said parts having a plurality of integrally formed radially projecting teeth, means coaxial with said parts and affording through said teeth an overrunning drive connection between said parts, said means having internal teeth projecting radially therefrom and operatively connectable with the other teeth to prevent overrunning between said parts in the same ratio as said overrunning drive.

21. In the drive system of a motor vehicle, clutch structure including first and second power transmitting parts having external radial projections, first and second overrunning clutch members having internal radial projections for mating with the respective external projections of said parts to thereby afford an overrunning one-way drive connection between said parts, the first member having additional radial projections connectable with projections of the second part to prevent overrunning of said parts, said parts and said members being coaxially arranged.

22. In the drive system of a motor vehicle, clutch structure including coaxially arranged drive and driven members, means for shifting one of said members relative to the other, means carried by one of said members for affording a one-way drive connection between said members, the second means and said members having clutch portions whereby engagement of the clutch portion of the second means with that of the other member affords a one-way drive connection between the said members, and interengagement of the clutch portions of said members affords a two-way drive connection between said members.

23. In the drive system of a motor vehicle, clutch structure including a power transmission part, an overrunning clutch part, said parts having integral interfitting external and internal radial projections extending therefrom, another overrunning clutch part, a member for preventing overrunning between said clutch parts, said member and said overrunning parts being coaxially arranged and having cooperable complemental external and internal projections extending radially therefrom.

24. In the drive system of a motor vehicle, clutch structure including a drive member having external teeth, a driven member having internal teeth and forming one part of an instantaneously acting one-way overrunning clutch, said clutch including another part having internal teeth and being rotatable relative to the first part only in the direction opposite to that in which the drive member rotates the driven member, said drive member and said parts being coaxially arranged, means for preventing axial separation of the clutch parts, and means for causing the external teeth to engage first with the teeth of the second clutch part to establish a one-way drive between said members, and then with the teeth of the first clutch part to establish a two-way drive between said members.

25. In the drive system of a motor vehicle, clutch structure including drive and driven members, and means comprising parts connected by a one-way clutch and slidable as a unit on one of said members in one direction so as to cause each of said parts to engage the other of said members, said parts being arranged coaxial with said members, one of said parts being arranged to engage said other member to afford a one-way drive between said members by said engagement, and the other of said parts being engageable with said other member to afford a two-way drive between said members by said engagement.

26. In the drive system of a motor vehicle, clutch structure including a driving shaft, a driven shaft disconnected therefrom, an overrunning clutch device including a pair of parts, one of said parts being rotatable with one of said shafts, said parts and said shafts being coaxially arranged, and means operable to couple said shafts together through the other clutch part, said means also being operable to establish a direct two-way drive connection between said shafts through the first part independently of the other part.

27. In the drive system of a motor vehicle, clutch structure including two relatively rotatable members, each provided with a set of teeth comprising a plurality of integrally formed projections extending radially therefrom, and which members form parts of two different types of clutches, and a relatively axially movable member having teeth adapted to mate with the teeth of said two relatively rotatable members, all of said members being coaxially arranged, said teeth of said relatively movable member being disconnectable from the teeth of at least one of said two relatively rotatable members for rendering one of the clutches associated with said relatively rotatable members operable, said last mentioned clutch being coupled by the tendency of said members to rotate relatively in one direction.

28. In the drive system of a motor vehicle, clutch structure including drive and driven parts, overrunning clutch members for connecting said parts together for a one-way drive, clutch means on said members, clutch means on one of said parts adapted to be clutched to both of said members to prevent relative rotation between said members, said members and said one of said parts being coaxially arranged, and shiftable means for controlling the clutching of said members to establish a one-way or a two-way drive between said members.

29. In the drive system of a motor vehicle, clutch structure including drive and driven members, means including a longitudinally shiftable overrunning clutch operable for establishing a one-way drive between said members, and means for establishing a direct two-way drive between said members for locking out said overrunning clutch, said means and said members being coaxially arranged.

30. In the drive system of a motor vehicle, clutch construction comprising a pair of members having aligned radially extending teeth, a third member having radially extending teeth cooperable with said aligned teeth for coupling said first mentioned members together, all of said members being coaxially arranged, two of said members being relatively movable axially with respect to the other of said members, a friction clutch operatively associated with two of said members, and a single means movable in one direction for relatively moving said members for successively rendering said friction clutch operative and for coupling said first mentioned members together.

31. In the drive system of a motor vehicle, clutch construction comprising a pair of members having aligned radially extending teeth, a third member having radially extending teeth cooperable with said aligned teeth for coupling said first mentioned members together, all of said members being coaxially arranged, two of said members being relatively movable axially with respect to the other of said members, a shaft, one of said members being slidably splined upon said shaft and carrying another of said members, a driving shaft connected to another of said members, a friction clutch operatively disposed between two of said members, and means for relatively moving said members for rendering said friction clutch operative and for further moving one of said members in the same direction for coupling said first mentioned members together.

32. In the drive system of a motor vehicle, clutch construction comprising a pair of members having aligned radially extending teeth, a third member having radial teeth for coupling said first mentioned members together, all of said members being coaxially arranged, two of said members being relatively movable axially with respect to the other of said members, a one-way clutch operatively disposed between two of said members, and means for relatively moving said members for coupling said first mentioned members together.

33. In the drive system of a motor vehicle, clutch structure including power transmission parts having radial projections, and connected relatively axially immovable friction clutch members having complementary radial projections for mating with the respective projections of said parts for establishing a one-way overrunning drive connection between said parts, said parts and said members being coaxially arranged, and means carried by one of said parts and being relatively movable axially with respect to said members for controlling the operation thereof.

34. In the drive system of a motor vehicle, clutch structure including power transmitting parts having radial projections, connected overrunning clutch members having complementary radial projections for mating with the respective projections of said parts for establishing an overrunning drive connection between said parts, said parts and said members being coaxially arranged, and means including axially movable radial clutch teeth operatively associated with said parts for establishing a two-way drive connection theretween.

35. In the drive system of a motor vehicle, clutch construction including power transmission parts having external radial projections, and connected overrunning clutch members having internal radial projections for mating with the respective external projections of said parts, said parts and said members being coaxially arranged, one of said members and one of said parts being relatively movable axially for selectively establishing a one-way and a two-way drive between said parts.

36. In the drive system of a motor vehicle, clutch structure including power transmission parts having radial projections, connected overrunning one-way clutch members having complementary radial projections for mating with the respective radial projections of said parts to thereby afford an overrunning one-way drive connection between said parts and means disposed coaxially with said members for rendering said overrunning one-way drive connection inoperative.

37. In the drive system of a motor vehicle, clutch structure including driving and driven shafts, two different types of clutches operatively disposed between said shafts and adapted to provide a direct drive between said shafts, said clutches including a shiftable part common to both of said clutches and carried by one of said shafts, one of said clutches being rendered inoperative upon coupling of the other of said clutches, one of said clutches comprising a pair of clutch bodies having complementary internal and external radial projections, said clutch bodies and said part being relatively movable with respect to each other and being coaxially arranged relative to said driven shaft, and a single means shiftable in one direction for rendering both of said clutches operable.

38. In the drive system of a motor vehicle, clutch construction comprising a pair of members having teeth, a shaft upon which one of said members is mounted, a third member having teeth for coupling said first mentioned members together, two of said members being relatively movable axially with respect to the other of said members, all of said members being coaxially arranged, a friction clutch operatively associated with two of said members, means for moving said members relatively, for rendering said friction clutch operable and for coupling said first mentioned members together upon further movement in the same direction.

39. In the drive system of a motor vehicle, clutch structure including drive and driven members having projections, a one-way clutch slidably mounted on of one said members and comprising two parts having a one-way driving relationship therebetween, said parts and one of said members being coaxially arranged, and projections on each of said parts adapted to mate with said projections on said members, the projections on one of said parts and one of said members being separable.

40. In the drive system of a motor vehicle, clutch structure comprising a pair of aligned shafts, one of which is provided with a peripheral face, shiftable means affording a one-way driving connection between said shafts, and means engageable with the peripheral face carried by one of said shafts to establish by such engagement a two-way drive between said shafts independent of said one-way drive means and in the same ratio as said one-way drive means.

41. In the drive system of a motor vehicle, clutch structure comprising drive and driven shafts, radial projections rotatable with said drive shaft, means affording an overrunning drive between said shafts comprising an overrunning clutch including a shell non-rotatably carried by said driven shaft, and a cam nested within said shell and having radial projections mating with said drive shaft radial projections, clutch rollers operatively disposed between said shell and said cam, said shell being provided with radial projections rotatable therewith for connecting with said drive shaft radial projections for establishing a two-way drive between said shafts, the pitch diameter of said radial projections being less than the pitch diameter of said clutch rollers.

42. In the drive system of a motor vehicle, clutch structure comprising relatively rotatable parts, one of which is provided with a set of radial projections immovable relative to said part, means affording a one-way drive between said parts, said means and said parts being coaxially arranged, part of said means comprising a set of radial projections immovable relative to said part and connectable with the radial projections of said one part for providing a two-way drive between said parts.

43. In the drive system of a motor vehicle, clutch structure comprising a pair of rotatable members having clutch teeth of substantially the same pitch diameter arranged in end to end relationship, a clutch mechanism operatively disposed between said members, and a third member having teeth adapted to mate with said clutch teeth of said members to prevent relative rotation between said members, all of said members being coaxially arranged, and a single shiftable means shiftable in one direction for successively rendering said clutch mechanism operative and mating said teeth.

44. In the drive system of a motor vehicle, clutch structure comprising overrunning parts having radial teeth, complementary radial teeth means engageable with said teeth to lock said parts against overrunning, said means and said parts being coaxially arranged, and clutch rollers operatively disposed between said parts, the pitch diameter of said teeth being less than the pitch diameter of said rollers.

45. In the drive system of a motor vehicle, clutch structure including drive and driven members having projections, a one-way clutch slidably mounted on one of said members and comprising two parts having a one-way driving relationship therebetween, and projections on each of said parts adapted to mate with said projections on one of said members, the projections on one of said parts and said one of said members being separable, said parts and said one of said members being coaxially arranged.

46. In the drive system of a motor vehicle, clutch structure including driving and driven shafts, a clutch member fixed for rotation with said driving shaft, an axially shiftable clutch member slidably splined to said driven shaft, a third clutch member carried by one of said clutch members so as to be capable of limited angular movement relative to one of said members, all of said clutch members being coaxially arranged, a friction clutch operatively associated with two of said clutch members, means for relatively axially shifting said clutch members for engaging one of said members with said fixed clutch member, to render said friction clutch operative for providing a friction drive between said shafts, the grip of said friction clutch being increased due to the torque resistance of one of said shafts to rotation by the other of said shafts, said means being further shiftable in the same direction for engaging the other of said members with said fixed clutch member for providing a positive drive between said shafts, said clutch members being provided with radially extending projections which are engageable for establishing said friction drive and said positive drive between said shafts.

47. In the drive system of a motor vehicle, clutch structure including driving and driven shafts, a clutch member fixed for rotation with said driving shaft, an axially shiftable clutch member slidably splined to said driven shaft, a third clutch member carried by one of said clutch members so as to be capable of limited angular movement relative to one of said members, all of said clutch members being coaxially arranged, a friction clutch operatively associated with two of said clutch members, means for axially shifting said shiftable clutch member for engaging one of said members with said fixed clutch member, to render said friction clutch operative for providing a friction drive between said shafts, the grip of said friction clutch being increased due to the tendency of said members to move angularly relative to each other, said means being further shiftable in the same direction for engaging the other of said members with said fixed clutch member for providing a positive drive between said shafts, said clutch members being provided with radially extending projections which are engageable for establishing said friction drive and said positive drive between said shafts.

48. In the drive system of a motor vehicle, clutch structure including driving and driven shafts, a clutch member fixed for rotation with said driving shaft, an axially shiftable clutch member slidably splined to said driven shaft, a third clutch member operatively associated with one of said clutch members so as to be capable of limited angular movement relative to one of said members, all of said members being coaxially arranged, a friction clutch operatively associated with two of said clutch members, said friction clutch being engaged by axial movement of said shiftable clutch member and the grip of said friction clutch being increased by the tendency of said shiftable member to move angularly relative to said third clutch member, said shiftable member being further shiftable axially for engagement with said fixed clutch member for providing a positive drive between said shafts, said clutch members being provided with radially extending projections which are engageable for establishing said friction drive and said positive drive between said shafts.

49. In the drive system of a motor vehicle, clutch structure including drive and driven clutch parts for providing an overrunning one-way drive, each of said parts being provided with a set of projections extending radially therefrom, at least one of said sets of projections being of the internal type, and means slidable axially relative to said parts and having projections cooperable with the projections of at least one of said parts to prevent overrunning between said parts, said means and said parts being coaxially arranged.

50. In the drive system of a motor vehicle, clutch structure comprising a pair of rotatable members having clutch teeth of the same pitch diameter arranged in end-to-end relationship, a friction clutch operatively disposed between said members, and a third member having teeth of substantially the same pitch diameter of the teeth of said members and adapted to mate with said clutch teeth of said members to prevent relative rotation between said members, all of said members being coaxially arranged, and a single shiftable means shiftable in one direction for successively rendering said friction clutch operative and mating said teeth.

51. In the drive system of a motor vehicle, clutch structure including drive and driven members, means comprising parts connected by a one-way clutch, said means being axially movable relative to one of said members so as to cause each of said parts to operatively engage said one of said members, said parts and said members being coaxially arranged, one of said parts being arranged to operatively engage said one member to afford a one-way direct drive between said members and the other of said parts being operatively engageable with said one member to afford a two-way drive between said members.

52. In the drive system of a motor vehicle, clutch structure including a pair of members having projections, a one-way friction clutch slidably mounted on one of said members and comprising two parts having a one-way driving relationship therebetween, and projections on each of said parts adapted to mate with said projections on said members, said members and said parts being coaxially arranged, and the projections on one of said parts and on one of said members being separable.

53. In the drive system of a motor vehicle, clutch structure including drive and driven parts, a sliding clutch member slidable on said driven part, an annular clutch member slidable with said clutch member and having a limited rotation relative to one of said parts, clutch means carried by said drive part, said parts and said members being coaxially arranged, and shift means for shifting said clutch members for clutching one of said clutch members with said clutch means prior to clutching the other of said clutch members to said clutch means, said clutch means and one of said members being provided with complementary radially extending projections adapted to be coupled together for clutching said member and said means for rotation together.

54. In the drive system of a motor vehicle, clutch structure including driving and driven shafts, one of said shafts being journaled within the other of said shafts, a clutch member fixed for rotation with said driving shaft, a clutch member slidably splined to said driven shaft, a clutch part associated with said slidable clutch member so as to be movable relative thereto and engageable with said drive shaft clutch member to provide a friction drive between said shafts, said part and said members being coaxially arranged, said clutch part and one of said clutch members being provided with radially extending projections which are engageable for establishing said friction drive, and the other of said clutch members being provided with complementary radially extending projections which are engageable with the projections of said one of said clutch members for providing a two-way drive between said shafts.

55. In the drive system of a motor vehicle, clutch structure including driving and driven shafts, a clutch member fixed for rotation with said driving shaft, an axially shiftable clutch member slidably splined to said driven shaft, a third clutch member carried by one of said clutch members so as to be capable of limited angular movement relative to one of said members, all of said members being coaxially arranged, a friction clutch operatively associated with two of said clutch members, means for relatively axially shifting said clutch members for engaging one of said members with said fixed clutch member, to render said friction clutch operative for providing a friction drive between said shafts, the grip of said friction clutch being increased due to the torque resistance of one of said shafts to rotation by the other of said shafts, said means being further shiftable in the same direction for engaging the other of said members with said fixed clutch member for providing a positive drive between said shafts, said fixed clutch member and said other of said members being provided with radially extending projections which are engageable for establishing said positive drive, said clutch members being so arranged with respect to each other that there is no resultant axial pressure between said clutch members when said radially extending projections are engaged.

56. In the drive system of a motor vehicle, clutch structure including driving and driven shafts, a clutch member fixed for rotation with said driving shaft, an axially shiftable clutch member slidably splined to said driven shaft, a third clutch member carried by one of said clutch members so as to be capable of limited angular movement relative to one of said members, all of said members being coaxially arranged, a friction clutch operatively associated with two of said clutch members, means for axially shifting said shiftable clutch member for engaging one of said members with said fixed clutch member to render said friction clutch operative for providing a friction drive between said shafts, the grip of said friction clutch being increased due to the tendency of said members to move angularly relative to each other, said means being further shiftable in the same direction for engaging the other of said members with said fixed clutch member for providing a positive drive between said shafts, said fixed clutch member and said other of said members being provided with radially extending projections which are engageable for establishing said positive drive between said shafts, said clutch members being so arranged with respect to each other that there is no resultant axial pressure between said clutch members when said radially extending projections are engaged.

57. In the drive system of a motor vehicle, clutch structure including driving and driven shafts, a clutch member fixed for rotation with said driving shaft, an axially shiftable clutch member slidably splined to said driven shaft, a third clutch member operatively associated with one of said clutch members so as to be capable of angular movement relative to one of said members, all of said clutch members being coaxially arranged, a friction clutch operatively associated with two of said clutch members, said friction clutch being engaged by axial movement of said shiftable clutch member, and the grip of said friction clutch being increased by the tendency of said shiftable member to move angularly relative to said third clutch member, said shiftable member being further shiftable axially for engagement with said fixed clutch member for providing a positive drive between said shafts, said shiftable member and said fixed clutch member being provided with radially extending projections which are engageable for establishing said positive drive between said shafts, said clutch members being so arranged with respect to each other that there is no resultant axial pressure between said clutch members when said radially extending projections are engaged.

58. In the drive system of a motor vehicle, clutch structure including driving and driven parts, a sliding clutch member slidable on said driven part, a unitary substantially non-yielding clutch member slidable with said clutch member, and capable of movement relative thereto, said clutch members and said parts being coaxially arranged, clutch means carried by said driving part, and a single shift means movable in one direction for shifting said clutch members for clutching one of said clutch members with said clutch means prior to clutching the other of said clutch members to said clutch means, said clutch means and one of said members being provided with complementary radially extending projections adapted to couple said clutch member and said driving part together for providing a positive drive between said parts, said clutch members being so arranged with respect to each other that there is no resultant axial pressure between said clutch members and said clutch means when said radially extending projections are coupled.

59. In a drive system of a motor vehicle, clutch structure including coaxial drive and driven parts, one of said parts being provided with radial projections, coaxially arranged means mating with said projections and affording an overrunning one-way friction drive connection between said parts, said means having an annulus of radial projections complementary to and connectable with said other projections to prevent overrunning between said parts, and manually controlled means for relatively shifting said projections to control the drive between said parts.

60. In the drive system of a motor vehicle, clutch structure including driving and driven shafts, one of said shafts being journaled within the other of said shafts, a clutch member fixed for rotation with said driving shaft, a clutch member slidably splined to said driven shaft, a unitary substantially non-yielding clutch part capable of movement relative to said slidable clutch member and slidable therewith for operatively engaging with said driving shaft clutch member to provide a friction drive between said shafts, said clutch members and said clutch part being coaxially arranged, said clutch members being provided with complementary internal and external radially projecting teeth adapted to be coupled for providing a positive drive between said shafts, and said clutch members and said clutch part being so arranged with respect to each other that there is no resultant axial pressure between said clutch members and said clutch part when said radially projecting teeth are coupled.

61. In the drive system of a motor vehicle, clutch structure including drive and driven members, a part slidably splined to one of said members, a unitary substantially non-yielding second part associated with said first part and capable of movement relative thereto, one of said parts being engageable with the other of said members to provide a friction drive between said members and the other of said parts being engageable with said other of said members to provide a positive drive between said members, said parts and said members being coaxially arranged, said other of said members and said other of said parts comprising clutch bodies, one of which is provided with projections extending radially from the periphery thereof, and the other of which is provided with complementary radially extending internal projections, said projections being adapted to be coupled together to provide a positive drive between said members, said clutch parts being so arranged with respect to each other that there is no resultant axial pressure between said clutch parts and said other of said members when said radially extending projections are coupled, and a single means shiftable in one direction for establishing said frictional drive and said positive drive.

62. In the drive system of a motor vehicle, clutch structure including driving and driven parts, inner and outer clutch members, one of said clutch members being slidable on said driven part, the other of said clutch members comprising a unitary substantially non-yielding part slidable with said one clutch member, and capable of movement relative thereto, said clutch members and said parts being coaxially arranged, clutch means carried by said driving part, and a single shiftable means movable in one direction for shifting said clutch members for clutching one of said clutch members with said clutch means prior to clutching the other of said clutch members to said clutch means, said clutch means and one of said members being provided with complementary radially extending projections adapted to couple said clutch member and said driving part together for providing a positive drive between said parts, said clutch members being so arranged with respect to each other that there is no resultant axial pressure between said clutch members and said clutch means when said radially extending projections are coupled.

63. In the drive system of a motor vehicle, clutch structure including driving and driven shafts, two different types of clutches operatively disposed between said shafts and adapted to provide a direct drive between said shafts, said clutches including a shiftable part common to both of said clutches and carried by one of said shafts, one of said clutches comprising a pair of clutch bodies having complementary internal and external radial projections, said clutch bodies and said part being relatively movable with respect to each other and being coaxially arranged relative to said driven shaft, and a single means shiftable in one direction for rendering both of said clutches operable, said clutch structure being disposed and arranged so that the operation of one of said clutches facilitates the operation of the other of said clutches.

64. In the drive system of a motor vehicle, clutch structure including drive and driven parts, a sliding clutch member slidable on said driven part, an annular clutch member slidable with said clutch member and having a limited rotation relative to one of said parts, clutch means carried by said drive part, said parts and said members being coaxially arranged, means including spring pressed elements for causing said annular clutch member and said slidable clutch member to move together and so arranged as to permit said annular clutch member and said slidable clutch member to move relative to each other, and shift means for shifting said clutch members for clutching one of said clutch members with said clutch means prior to clutching the other of said clutch members to said clutch means, said clutch means and one of said members being provided with complementary radially extending projections adapted to be coupled together for clutching said member and said means for rotation together.

65. In the drive system of a motor vehicle, clutch structure including drive and driven shafts, two different types of clutches operatively disposed between said shafts and adapted to provide a direct drive between said shafts, said clutches including relatively shiftable elements, three of which are provided with aligned teeth extending radially therefrom one of said elements being adapted to couple the other two elements for rotation together, one of said elements being slidable on said driven shaft, said elements and said shafts being coaxially arranged, said clutch structure being disposed and arranged so that the operation of one of said clutches facilitates the coupling of said members for rotation together through said teeth, and a single means shiftable in one direction for rendering both of said clutches operable.

66. In the drive system of a motor vehicle, clutch structure including driving and driven shafts, a clutch member fixed for rotation with said driving shaft, an axially shiftable clutch member slidably splined to said driven shaft, a third clutch member operatively associated with one of said clutch members so as to be capable of angular movement relative to one of said members, all of said clutch members being coaxially arranged, a friction clutch operatively associated with two of said clutch members, said friction clutch being engaged by axial movement of said shiftable clutch member, and the grip of said friction clutch being increased by the tendency of said shiftable member to move angularly relative to said third clutch member, said shiftable member being further shiftable axially for engagement with said fixed clutch member for providing a positive drive between said shafts, said shiftable member and said fixed clutch member being provided with radially extending projections which are engageable for establishing said positive drive between said shafts, said clutch members being so arranged with respect to each other that there is no resultant axial pressure between said clutch members when said radially extending projections are engaged, and said clutch structure being further disposed and arranged so that the operation of said friction clutch facilitates the establishing of said positive drive.

67. In the drive system of a motor vehicle, clutch structure including driving and driven shafts, two different types of clutches operatively disposed between said shafts, said clutches including a shiftable part common to both of said clutches and carried by one of said shafts, a part of each of said clutches, and said shiftable part being provided with clutch teeth of substantially the same pitch diameter, said clutch parts being relatively movable with respect to each other and being coaxially arranged, said clutch structure being disposed and arranged so that the operation of one of said clutches facilitates the operation of the other of said clutches, and a single means shiftable in one direction for controlling the operation of both of said clutches.

68. In the drive system of a motor vehicle, clutch structure including driving and driven shafts, one of said shafts being journaled within the other of said shafts, a clutch member fixed for rotation with said driving shaft, a clutch member slidably splined to said driven shaft, a clutch part associated with said slidable clutch member so as to be movable relative thereto and engageable with said drive shaft clutch member to provide a friction drive between said shafts, said part and said members being coaxially arranged, means including spring pressed elements for causing said clutch part and said slidable clutch member to move together and so arranged as to permit said clutch part and said slidable clutch member to move relative to each other, said clutch part and one of said clutch members being provided with radially extending projections which are engageable for establishing said friction drive, and the other of said clutch members being provided with complementary radially extending projections which are engageable with the projections of said one of said clutch members for providing a two-way drive between said shafts.

CARL F. RAUEN.